Feb. 23, 1937.  J. J. R. BRISTOW  2,072,022
METHOD OF COLORING FRUITS AND VEGETABLES
Filed Feb. 5, 1935
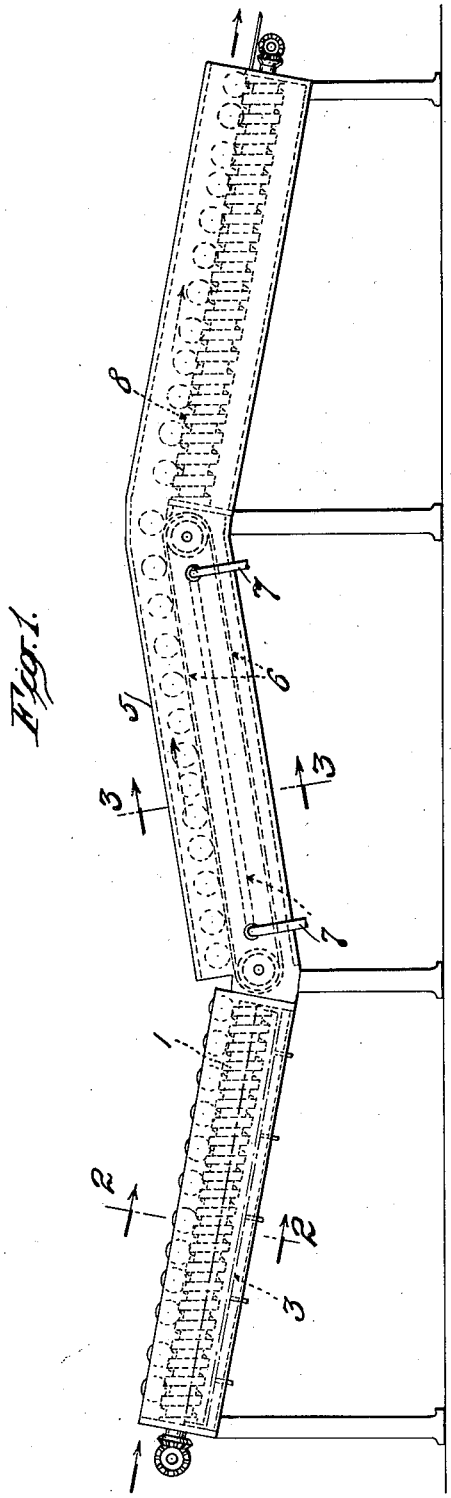
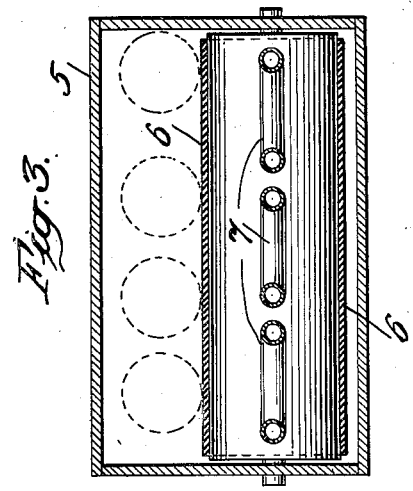
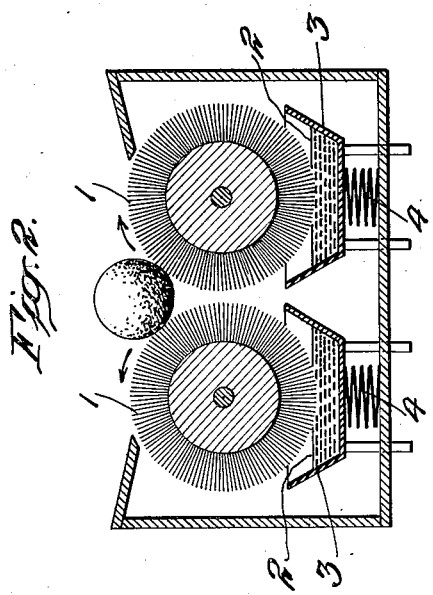
INVENTOR
JAMES JEFFERSON RUCKER BRISTOW
BY
ATTORNEY Patented Feb. 23, 1937

2,072,022

UNITED STATES PATENT OFFICE 2,072,022

METHOD OF COLORING FRUITS AND VEGETABLES

James Jefferson Rucker Bristow, Safety Harbor, Fla., assignor to Consumer Package Corporation, Dunedin, Fla., a corporation of Florida Application February 5, 1935, Serial No. 5,010

2 Claims. (Cl. 99—103)

This invention relates to a method of artificially coloring or dyeing the exterior surfaces of fruits and vegetables for the purpose of enhancing their appearance and saleability.

One of the principal uses of the invention is in coloring citrus fruits, such as oranges, tangerines and grapefruit; hence the treatment of such fruits will be used to illustrate the invention but not to limit its scope.

The usual method of coloring citrus fruits, etc., is to dip the fruit into a warm emulsion of an oil-soluble dye, wash off the excess dye and then dry the fruit in any suitable manner. One disadvantage of this method is that the warm water immersion tends to weaken the fruit and remove the natural wax; also, present methods include the use of soap which removes a large percentage of the natural wax from the fruit. Another disadvantage is that only a small portion of the dye is used, after which the solution must be discarded. My object is to avoid these disadvantages and at the same time give the fruits, etc., a more attractive and more permanent color coating than heretofore.

It is a well known fact that all citrus fruits and most other fruits and vegetables excrete a natural oil or wax which coats their surface and prevents evaporation of water from the interior. I take advantage of this fact by applying an oil-soluble color to the surface of the fruit or vegetable in such a way that it is absorbed and incorporated in the natural wax without risk of damage and with a substantial saving in coloring material.

In carrying out the invention the oil-soluble color is preferably mixed with any suitable diluent of a dry, neutral character such as hard wax, paraffine, bees-wax, kieselguhr, sawdust, etc., or it may be applied directly to the fruit or vegetable in a thin uniform layer with no diluent. The coloring material or mixture is applied to the outer surface of the fruit or vegetable in any suitable manner as by dipping, rubbing or brushing until it adheres to said surface, after which the fruit or vegetable is heated in a dry heating chamber at such temperature that the natural wax softens and takes up part of the oil-soluble color. The excess coloring material or mixture is then brushed or rubbed off and recovered, leaving the color in solution in the natural wax coating of the object so treated.

These and other features and advantages of the invention will be described in connection with the accompanying drawing, in which:

Fig. 1 is a side elevation showing an organization of apparatus suitable for carrying out my method;

Fig. 2 is a transverse section on line 2—2 of Fig. 1, showing the method of applying the coloring material; and Fig. 3 is a transverse section on line 3—3 of Fig. 1, showing the drying chamber.

As a preferred mode of procedure, in coloring oranges, so that the resultant shade is a deeper orange than is natural at some periods of the marketing season, I wash the fruit carefully to free them from all adhering dirt or grease. I then pass them over rotating brushes 1 impregnated with a dry oil-soluble color mixture 2 which may be in the form of a cake or other dry mass contained in pans 3 extending lengthwise of the brushes and supported by springs 4 which hold the material 2 against the brushes as shown in Fig. 2.

The coloring material itself may be any harmless, oil-soluble dye such as may be obtained on the open market, and any neutral matrix from sawdust, paraffine, etc., to the pure dye alone, will suffice as a carrying agent or diluent. The proportion of dye employed in the matrix depends entirely on the strength of the dye, the nature of the fruit wax and the depth of color to be imparted to the fruit, the dye usually running anywhere from 10% to 25% when melted with paraffine. The higher the percentage of color in the mixture, the greater will be the transfer. In the form shown in the drawing the applying brushes 1 are provided with spiral grooves which convey the oranges forward while constantly rotating them and rubbing the dye on until it sticks to the surface of the fruit.

The oranges coated in this manner are next introduced into a heating chamber 5 where they are carried forward by a conveyor belt 6 made of canvas or other suitable material. This chamber is heated in any suitable manner, as by means of steam pipes 7. The temperature of chamber 5 varies with the time of exposure, viz. about 130° F. for five minutes, or 180° F. for two minutes. The temperature and time of treatment will also vary according to the type of fruit or vegetable treated, the preferred condition being such as will provide maximum coloration without injuring the fruit or vegetable.

From the heating chamber the oranges pass over rapidly revolving brushes 8 which remove the excess color and even out irregularities, leaving a smooth, uniform coat of the desired color. The shade of color, as stated above, is regulated by the amount of color in the mixture 2. The excess color mixture may easily be recovered and re-used.

Among the advantages of my method over previous methods may be mentioned the fact that, (1) a more uniform color is obtained without streaks or splotches; (2) no color is wasted as in the case of an emulsion which must be thrown away before being completely used, due to the difficulty of introducing additional color uniformly; (3) the fruit is not subjected to wet heat as is the case where water solutions or emulsions are employed, and such warm baths accelerate the tendency to decay which is avoided by my method. All other known methods include the use of emulsions or soap solutions which remove a large part of the natural wax from the fruit.

It will be evident that my invention is capable of various modifications and adaptations not specifically described herein but included within the scope of the appended claims.

The invention claimed is:

1. Method of improving the appearance of citrus fruit which comprises mixing a coloring matter soluble in the natural wax present in the peel of the fruit with a dry solid carrier, applying the mixture to the surface of the fruit, and subjecting the fruit to a temperature between 130° F. and 180° F. until the color is absorbed by the natural wax of the fruit.

2. Method of improving the appearance of citrus fruit which comprises mixing a coloring matter soluble in the natural wax present in the peel of the fruit with a dry solid carrier, applying the mixture to the surface of the fruit, subjecting the fruit to a temperature between 130° F. and 180° F. until the color is absorbed by the natural wax of the fruit, and brushing the surface to remove excess color and to even out irregularities so as to leave a uniform coat of the desired color.

JAMES JEFFERSON RUCKER BRISTOW.